United States Patent
Shao

(10) Patent No.: US 7,869,008 B2
(45) Date of Patent: Jan. 11, 2011

(54) DEVICE OF DETECTING LIGHT REFLECTING SPEED AND DIRECTION, AND METHOD THEREOF

(75) Inventor: Chih-Yung Shao, Linkou Township (TW)

(73) Assignee: Mitac International Corp., Taoyuan (TW)

( * ) Notice: Subject to any disclaimer, the term of this patent is extended or adjusted under 35 U.S.C. 154(b) by 217 days.

(21) Appl. No.: 12/322,772

(22) Filed: Feb. 6, 2009

(65) Prior Publication Data

US 2010/0201967 A1    Aug. 12, 2010

(51) Int. Cl.
    *G01P 3/36* (2006.01)
(52) U.S. Cl. ........................... 356/28; 356/28.5
(58) Field of Classification Search ....... 356/3.01–3.15, 356/4.01–4.1, 5.01–5.15, 6–22, 28, 28.5
    See application file for complete search history.

(56) References Cited

U.S. PATENT DOCUMENTS 6,491,420 B1 * 12/2002 Scifres ................. 362/553

2008/0200274 A1 *  8/2008  Haag et al. ................. 473/222

* cited by examiner

Primary Examiner—Thomas H Tarcza
Assistant Examiner—Luke D Ratcliffe
(74) Attorney, Agent, or Firm—Hudak, Shunk & Farine Co. LPA

(57) ABSTRACT

A device of detecting light reflecting speed and directions includes a light source, a light-guided pulley, a reflector, photo detectors, barriers, a processor and a display unit. The light source generates incident light, the light-guided pulley is located at one side of the light source, and includes a support moving along the pulley track. The reflector is installed on the support to reflect the incident light. The photo detectors detect the incident light reflected by the reflector. The barriers are located at two sides of the light source and make the incident light to be a light beam and travel in straight line direction. The barriers are respectively installed between said photo detectors to isolate the incident light. The processor receives the light signals transmitted from photo detectors and processes the light reflecting speed and directions according to the light signals. The processed result is displayed on the display unit.

10 Claims, 6 Drawing Sheets

DEVICE OF DETECTING LIGHT REFLECTING SPEED AND DIRECTION, AND METHOD THEREOF

FIELD OF THE INVENTION

This present invention is related to a detecting device, particularly related to a device capable of detecting light reflecting speed and directions by using a photoelectric structure, and its method.

BACKGROUND OF THE INVENTION

Currently, detectors for speed and directions are broadly applied to many fields, such as National Defense field, Aviation field, Industries field, Information consuming field and Automobile Industry field.

Conventional detectors for speed and directions were designed by using means of capacitance, which often reacted with mechanical damping and capacitance structure. Because charge and discharge of capacitance took more time, the conventional detector has worse flexibility and an exponential detection curve with larger error.

SUMMARY OF THE INVENTION

In view of the above-mentioned problems, the objective of the present invention is to provide a device of detecting light reflecting speed and direction, and method thereof.

In order to achieve the objective, the present invention provides a device of detecting light reflecting speed and directions, comprising a light source, a light-guided pulley, a reflector, a plurality of photo detectors, a plurality of barriers, a processor and a display unit. The light source is for generating an incident light, the light-guided pulley is located at one side of the light source, and comprises a support moving along the pulley track. The reflector is installed on the support to reflect the incident light. The photo detectors are for detecting the incident light reflected by the said reflector. The barriers are located at two sides of the light source and make the incident light to be a light beam and travel in straight line direction. The barriers are respectively installed between said photo detectors to isolate the incident light. The processor is connected to the photo detectors for receiving the light signals transmitted from photo detectors and processes the light reflecting speed and directions according to the light signals. The display unit is for displaying the processed result transmitted from processor.

Preferably, the light source can be an LED light source. Preferably, the processor further comprises a plurality of registers and a processing unit. A plurality of operational amplifiers are respectively installed between the registers of the processing unit and photo detectors. Preferably, a plurality of rollers are installed at the bottom of the support of the said light guided pulley, so as to enable the light-guided pulley moving along a pulley track.

Besides, the present invention further provides a method of detecting light reflecting speed and directions, comprising the following steps of:

a) generating an incident light traveling along straight direction;

b) using a reflector on a light-guided pulley to reflect the incident light to photo detectors which are respectively located in the barriers aligned at interval, wherein the light-guided pulley can move along a pulley track;

c) using the photo detector to transform the detected incident light signals into electric signals which is then transmitted to a processor for processing light reflecting speed and direction; and d) using a display unit to display the processed result.

Preferably, the processor further comprises a plurality of registers and a processing unit. A plurality of operational amplifiers are respectively installed between the registers and photo detectors. While the photo detector detects light signal, the correspondingly connected operational amplifier outputs a high-level signal, and while the photo detector does not detect light signal, the correspondingly connected operational amplifier outputs a low-level signal.

Preferably, the register further comprises a first register and a second register, and the first register is used for storing the outputted result of the operational amplifier before the light-guided pulley moves, and the second register is used for storing the outputted result of operational amplifier after the light-guided pulley moves.

Preferably, the step of processing the light reflecting direction by the processor further comprises the following sub-steps of:

(a) initially setting the stored result of the first register before the light-guided pulley moving equal to the stored result of the second register;

(b) storing the stored result of the second register into the first register by the processor;

(c) detecting the reflecting light by every photo detector and transmitting the detected result to the second register via operational amplifiers respectively connected to photo detectors when light-guided pulley moves to a new position, and performing a subtraction operation on the content of the second register and the content of the first register;

(d) checking the operation result, and indicating that the light-guided pulley moves toward the light source if the operation result is positive, and indicating that the light-guided pulley moves away from the light source if the operation result is negative, and indicating that the light-guided pulley does not move if the operation result is zero, and retransforming the operation result to zero; and (e) displaying the result of the moving direction of the light-guided pulley, and repeating step (b), (c), (d), and (e) before next detection.

Preferably, the step of processing the light reflecting speed by the processor further comprises the following steps of:

(1) storing the stored result of the second register into the first register, and resetting the accumulator installed in the processor when the reflected light enters the photo detectors, wherein the accumulator is used for recording the numbers of moved photo detector;

(2) updating the content of the second register and performing a exclusive-or operation on the content of the second register and the first register while the reflected light is detected to enter the photo detector near the said photo detectors, and repeating step (1) if the operation result is zero, and storing the content of second register into the first register and enabling the accumulator to count if the operation result is not zero; and (3) determining whether or not the count result of the accumulator is equal to 2, and then calculating and displaying the speed if the count result is equal to 2, and repeating step (1) if the count result is not equal to 2.

Compared with the conventional detector, the device of detecting light reflecting speed and direction and method thereof in accordance with the present invention use photoelectric structural detection to enhance the detecting flexibility without resume time of the charge and discharge of capacitance, and the detecting curve of the present invention is approximate linear.

For further understanding of the objective, structural character and function of the present invention, the detailed explanation matching with the illustration is as follows.

BRIEF DESCRIPTION OF THE DRAWINGS

The subject matter regarded as the invention is particularly pointed out and distinctly claimed in the concluding portion of the specification. The invention, both as to device and method of operation, together with features and advantages thereof may best be understood by reference to the following detailed description with the accompanying drawings in which:

DETAILED DESCRIPTION OF THE PREFERRED EMBODIMENTS

Figure 1:
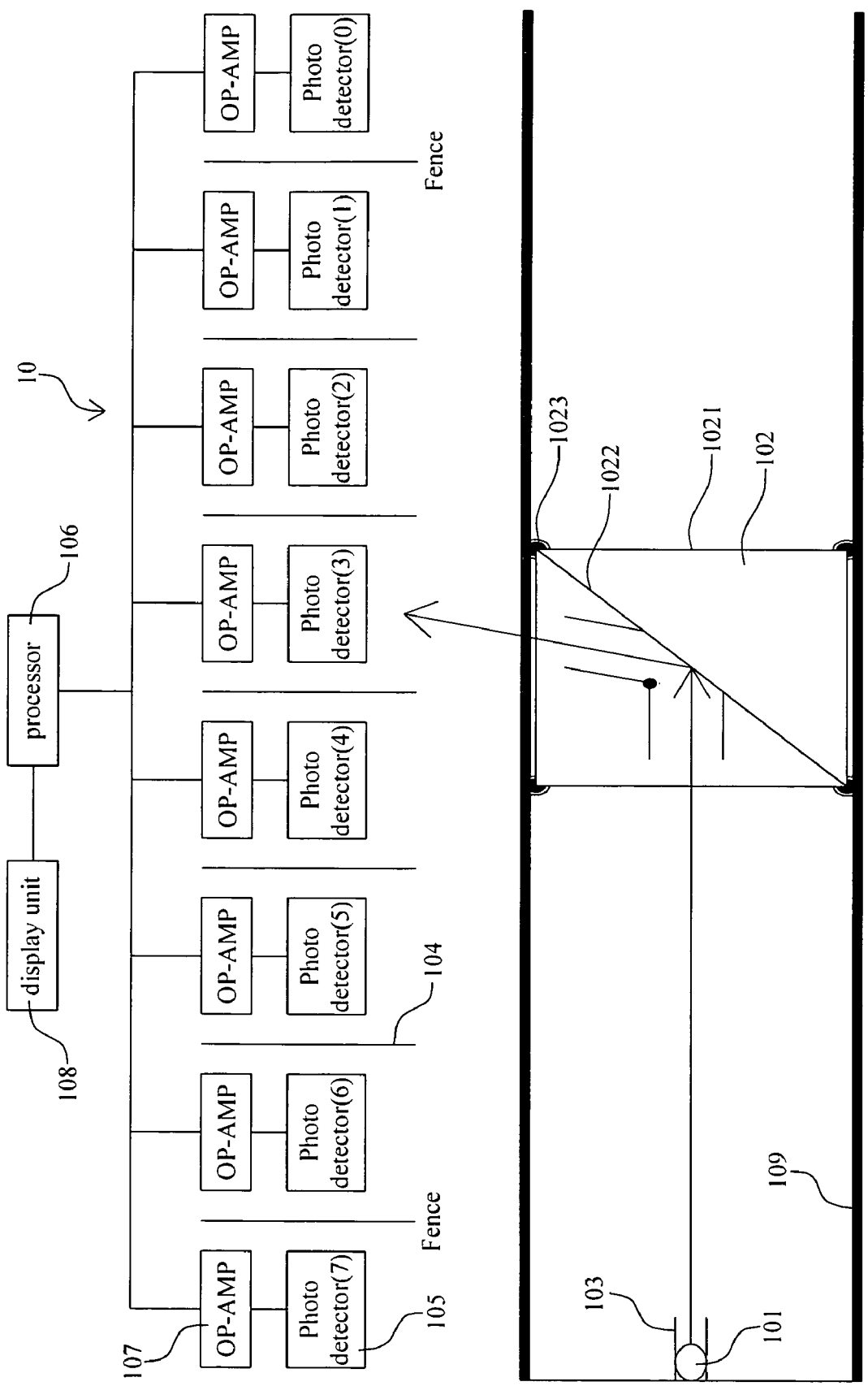
FIG. 1 is a schematic view of the device of detecting light reflecting speed and direction in accordance with the present invention.

FIG. 1 illustrates a schematic view of the device of detecting light reflecting speed and directions in accordance with the present invention. The device 10 of detecting light reflecting speed and directions comprises a light source 101, a light-guided pulley 102, a plurality of first barriers 103, a plurality of second barriers 104, a plurality of photo detectors 105, a processor 106, a plurality of operational amplifiers 107, a display unit 108 and a pulley track 109. The photo detectors 105 are shown as photo detector (0) to photo detector (7) in FIG. 1. The operational amplifiers 107 are shown as OP-AMP in FIG. 1, and respectively connected between every photo detector 105 and processor 106.

Figure 3:
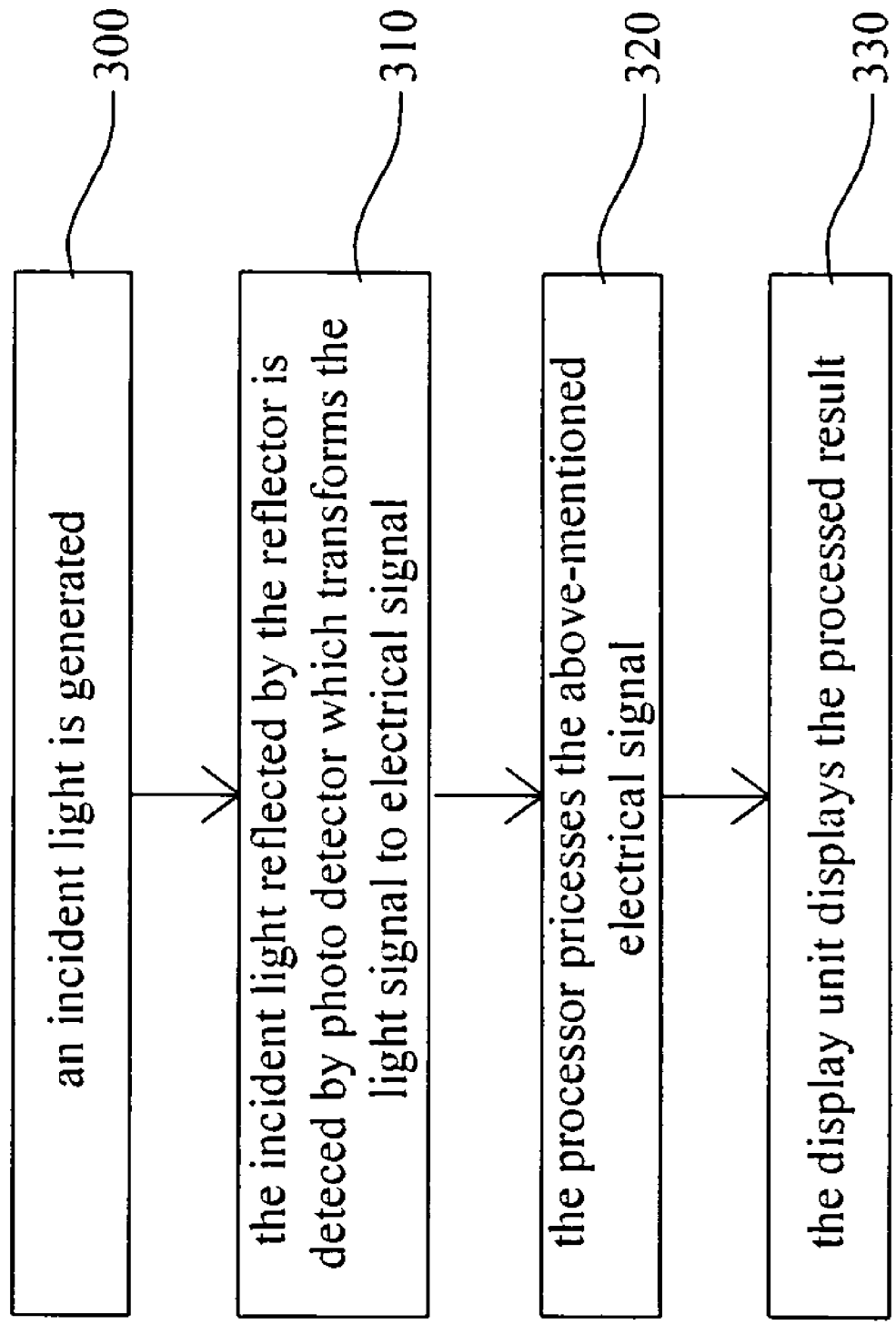
FIG. 3 is a flow chart of the method of detecting light reflecting speed and direction in accordance with the present invention.

Besides, please refer to FIG. 3 which illustrates a flow chart of the method of detecting light reflecting speed and direction in accordance with the present invention. The present invention provides a method of detecting light reflecting speed and directions. The method comprises the following steps. In step 300, an incident light is generated to travel along straight line direction. In step 310, the incident light is reflected by the reflector on the light-guided pulley to enter the photo detectors in the barriers aligned at interval. The light-guided pulley can move along the pulley track. In step 320, the photo detector transforms the detected incident light signals into electric signals, and transmits the electric signal to a processor which then processes light reflecting speed and directions according to the electric signals. In step 330, the processed result is displayed by display unit.

Preferably, the light source 101 can be an LED light source which generates an infrared ray in regular wavelength. The first barrier 103 is respectively installed at two sides of the light source to prevent infrared ray from dispersing colors and guide the infrared ray to travel along straight line direction.

The light-guided pulley 102 is located at one side of the light source 101. The light-guided pulley 102 mainly comprises a support 1021 and a reflector 1022 which is fixed on the support 1021. The rollers 1023 are installed at the bottom of support 1021, so that the light-guided pulley 102 can move along pulley track 109 toward light source 101 or away from light source 101.

Beside, the photo detectors 105 are respectively located between the second barriers 104. When the light-guide 102 locates at current position, the photo detector 105 detects the infrared ray which is reflected by reflector 1022, and the photo detector 105 transforms the infrared ray signals into electric signals which is then transmitted to operational amplifier 107 electrically connected to the photo detector 105, and then operational amplifier 107 outputs a high-level signal to processor 106, and the other operational amplifiers 107 which are connected to the photo detector 105 and don't receive the infrared ray light signals output low-level signal to processor 106.

Figure 2:
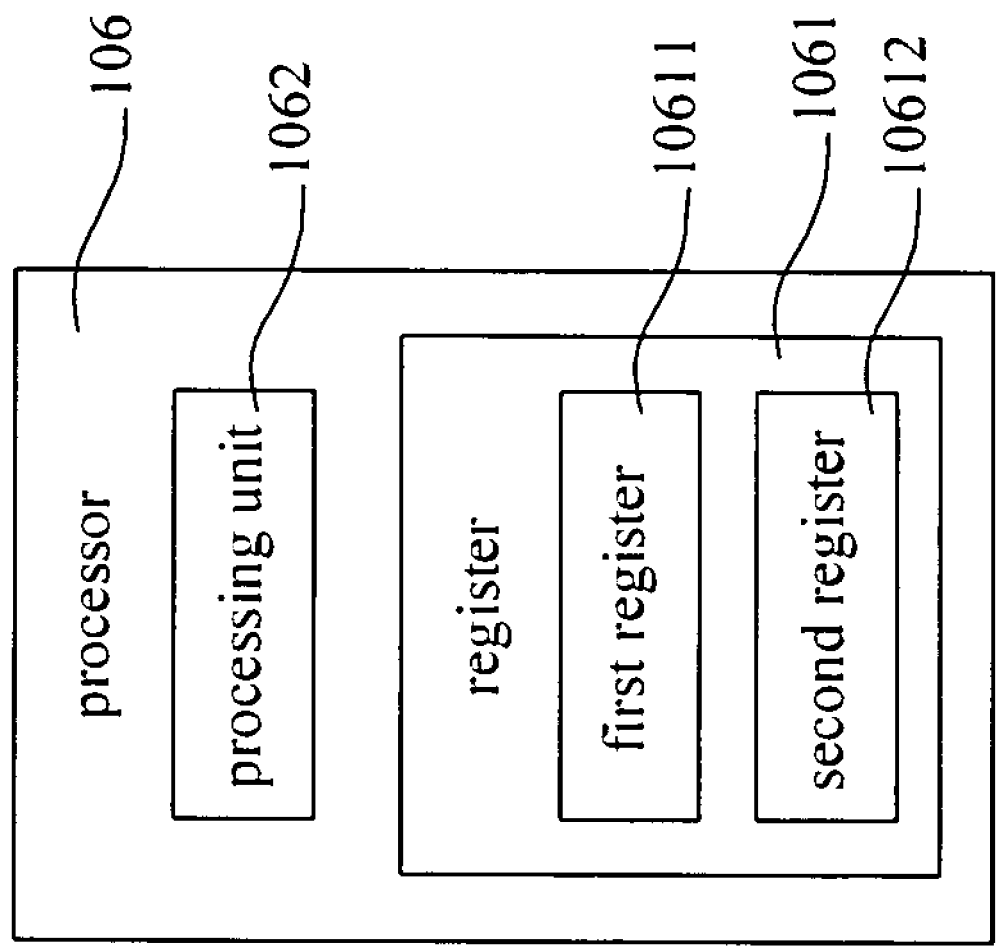
FIG. 2 is a block diagram of the processor in accordance with the present invention.

Referring to FIG. 2, the processor 106 mainly comprises a register 1061 and a processing unit 1062, and that register 1061 comprises a first register 10611 and a second register 10612. The first register 10611 is used to store the outputted results from each of the operational amplifiers 107 when the light-guided pulley 102 is located at current position.

When light-guided pulley 102 moves along the pulley track 109 from the current position to a new position, another photo detector 105 detects the infrared ray reflected by reflector 1022 on the light-guided pulley 102, and transforms the infrared ray signal into electric signal, and transmits the electric signal to operational amplifier 107 which is electrically connected to the photo detector 105, and then the operational amplifier 107 outputs a high-level signal to processor 106, and other operational amplifiers connected to the photo detector 105 and do not receive infrared ray signals output low-level signal to the processor 106, and the outputted result from each of the operational amplifiers are stored in the second register 10612 of the processor 106.

Figure 4:
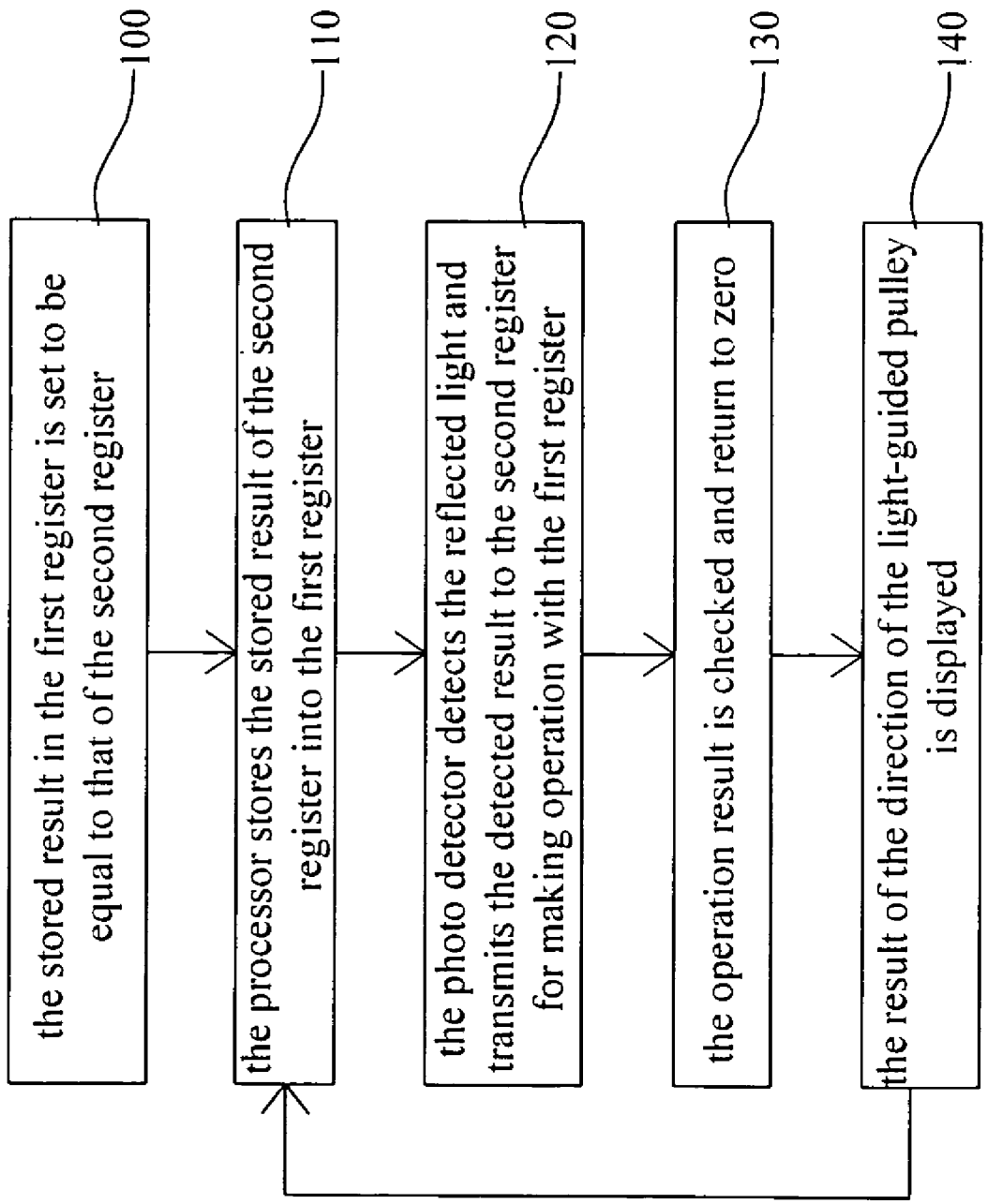
FIG. 4 is a flow chart of method of detecting light reflecting direction in accordance with the present invention.

FIG. 4 illustrates a flow chart of direction detection proceeded by the device of detecting light reflecting speed and directions in accordance with the present invention. If the direction of infrared ray moving from the said current position to a new position has to be detected, the following steps needed to be processed by the said processor.

In step 100, when being turned on, the device has to be initialized. Before the light-guided pulley moves, it means that the light-guided pulley is at the current position, the stored result in the first register is set to be equal to the stored result of the second register.

In step 110, the processor stores the stored result of the second register into the first register.

In step 120, When the light-guided pulley moves from the current position to a new position, the photo detector detects the reflected light and then transmits the detected result to the second register via the operational amplifiers which are respectively connected to each photo detector, and a subtraction operation is performed on the content of the second register and the content of the first register.

In step 130, the operation result is checked, and if the operation result is positive, it indicates that the light-guided pulley moves toward the light source; if the operation result is negative, it indicates that the light-guided pulley moves away from the light source; if the operation result is zero, it indicates that the light-guided pulley does not move. The operation result is then returned to zero.

In step 140 the result of the direction of the light-guided pulley is displayed, and step 100, 110, 120 and 130 are repeated before next detection.

The following table 1 is a table of stored result of the first register 10611. This table is applied to store the output result of each photo detector before the light-guided pulley moves, which means the light-guided pulley is at the current position.

TABLE 1

| P7 | P6 | P5 | P4 | P3 | P2 | P1 | P0 |
|----|----|----|----|----|----|----|----|
| 0  | 0  | 0  | 0  | 0  | 0  | 1  | 0  |

The following table 2 is a table of stored result of the second register 10612. This table is applied to store the output result by each photo detector when the light-guided pulley moves to a new position.

TABLE 2

| P7 | P6 | P5 | P4 | P3 | P2 | P1 | P0 |
|----|----|----|----|----|----|----|----|
| 0  | 0  | 0  | 1  | 0  | 0  | 0  | 0  |

From the above mentioned, we can know:

Subtract the stored value of the first register from the stored value of the second register and we can obtain a positive value, and know the light-guided pulley moves toward left.

00010000−00000010=00001110.

At this time, shifting detection is performed, the subtracted result is shifted toward right until the minimum byte becomes 1, and we get 00000111. After adding these 1, and then we get 3, so we can know the light-guided pulley moved three distances of photo detector toward left. If the interval between two photo detectors is set as 1 cm, we can know the distance S that the light-guided pulley moved toward left is 3 cm finally.

Figure 5:
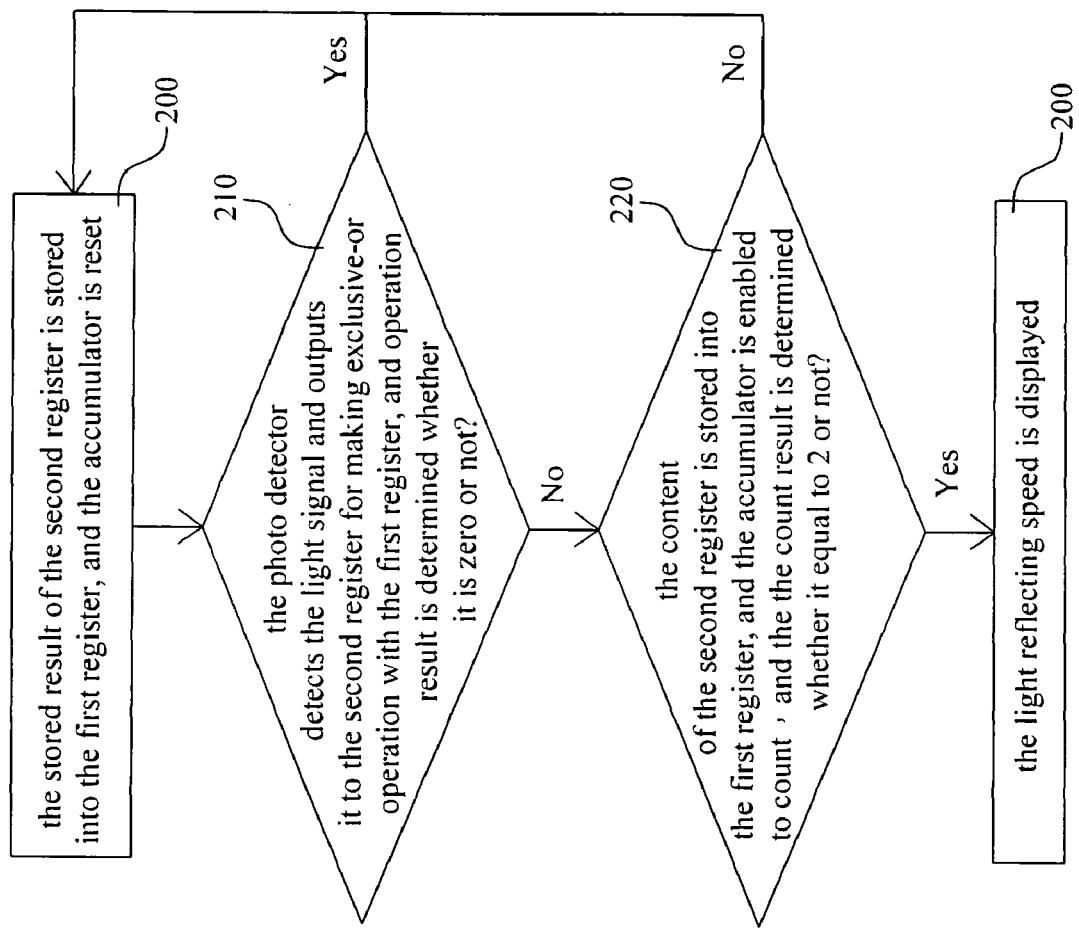
FIG. 5 is a flow chart of method of detecting light reflecting speed in accordance with the present invention.

FIG. 5 illustrates a flow chart of speed detection proceeded by the device of detecting the said light reflecting speed and direction in accordance with the present invention. The processor is required to process the following steps.

In step 200, when the reflected light enters a photo detector, the stored result of the second register is stored into the first register, and the accumulator installed in the processor is reset. This accumulator is applied to record the numbers of the moved photo detectors.

In step 210, when the reflected light is detected to enter the photo detector which is next to the said photo detector, the content of the second register is updated, and performed an exclusive- or operation with the content of the first register. If the operation result is 0, step 200 is repeated; if the result is not 0, the content of the second register is stored into the first register, and the accumulator is enabled to count.

In step 220, the count result of the accumulator is determined whether or not it is equal to 2. If the count result is equal to 2, the light reflecting speed is calculated and displayed in step 230; if the count result is not equal to 2, step 200 is repeated.

Figure 6:
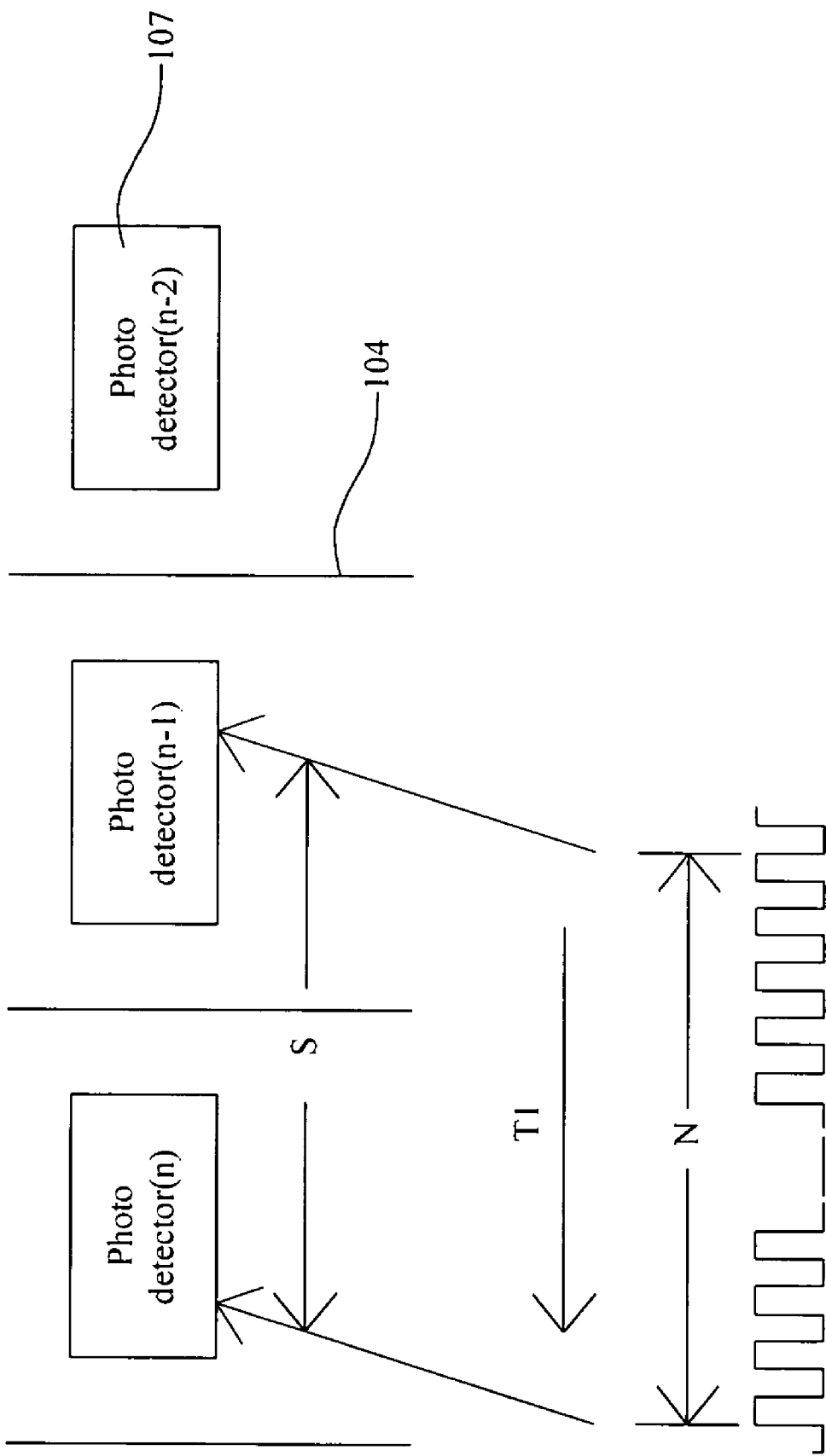
FIG. 6 is a schematic view of detecting light reflecting speed in accordance with the present invention.

FIG. 6 illustrates a schematic view of speed detection proceeded by the device of detecting light reflecting speed and direction in accordance with the present invention. N represents the number of pulse counts of photo-detector (n−1) to photo-detector (n), and can be obtained by calculating with the timer installed in the processor. According to the frequency formula: $T=1/f$, we can obtain a time T of pulse. So, the time taken for reflecting light to move from photo-detector (n−1) to photo-detector (n) is T1, and $T1=N \times T$. From the above mentioned that S, N and T can be obtained and known, and speed V can be obtained according to the speed formula: $V=S/T1$, so that device 10 of detecting the light reflecting speed and directions can be used to complete the detection for speed and directions of infrared ray.

Finally, the display unit 108 connected to processor 106 is used to display the processed result of infrared ray direction and speed by device 10 of detecting the light reflecting speed and directions.

The aforesaid are just preferred embodiments of this present invention. These embodiments are not applied to limiting the implementation range of this present invention. All equal variation and beautifying made by us within the scope of applying to patent for this present invention are contained in the scope of the patent for this present invention.

What is claimed is:

1. A device of detecting light reflecting speed and directions, comprising:
    a light source for generating an incident light;
    a light-guided pulley located at one side of the light source, containing a support moving along the pulley track, and a reflector installed on the support for reflecting the incident light;
    a plurality of photo detectors for detecting the incident light reflected by the reflector;
    a plurality of barriers located at two sides of the light source and installed respectively between each of the photo detectors for isolating the incident light;
    a processor connected to the photo detectors, for receiving the light signals transmitted from the photo detectors and processing the light reflecting speed and direction according to the light signals; and
    a display unit for displaying the processed result transmitted from the processor.

2. The device of claim 1, wherein the light source is an LED light source.

3. The device of claim 1, wherein the processor comprises a plurality of registers and a processing unit.

4. The device of claim 3, wherein a plurality of operational amplifiers are installed between the register of the processor and each photo detector respectively.

5. The device of claim 1, wherein a plurality of rollers are installed at the bottom of the support of the light-guided pulley.

6. A method of detecting light reflecting speed and direction comprising the following steps of:
    (a) generating an incident light traveling along the straight line direction;
    (b) using a reflector on a light-guided pulley to reflect the incident light to photo detectors which are respectively located in the barriers aligned at interval, wherein the light-guided pulley can move along a pulley track;
    (c) using the photo detector to transform the detected incident light signals into electric signals which is then transmitted to a processor for processing light reflecting speed and direction; and
    (d) using a display unit to display the processed result.

7. The method of claim 6, wherein the processor comprises a plurality of registers and a processing unit, and a plurality of operational amplifier are installed between the registers of the processor and photo detectors respectively, and while the photo detector detects light signal, the correspondingly connected operational amplifier outputs a high-level signal, and while the photo detector does not detect light signal, the correspondingly connected operational amplifier outputs a low-level signal.

8. The method of claim 7, wherein the register comprises a first register and a second register, and the first register is used for storing the outputted result of the operational amplifier before the light-guided pulley moves, and the second register is used for storing the outputted result of operational amplifier after the light-guided pulley moves.

9. The method of claim 8, wherein the step of processing the light reflecting direction by the processor further comprises the following sub-steps of:
   (a') initially setting the stored result of the first register before the light-guided pulley moving equal to the stored result of the second register;
   (b') storing the stored result of the second register into the first register by the processor;
   (c') detecting the reflecting light by every photo detector and transmitting the detected result to the second register via operational amplifiers connected to every photo detector when light-guided pulley moves to a new position, and performing a subtraction operation on the content of the second register and the content of the first register;
   (d') checking the operation result, and indicating that the light-guided pulley moves toward the light source if the operation result is positive, and indicating that the light-guided pulley moves away from the light source if the operation result is negative, and indicating that the light-guided pulley does not move if the operation result is zero, and retransforming the operation result to zero; and
   (e') displaying the result of the moving direction of the light-guided pulley, and repeating step (b'), (c'), (d'), and (e') before next detection.

10. The method of claim 9, wherein the step of processing the light reflecting speed by the processor further comprises the following sub-steps of:
   (1) storing the stored result of the second register into the first register, and resetting the accumulator installed in the processor when the reflected light enters the photo detectors, wherein the accumulator is used for recording the numbers of moved photo detector;
   (2) updating the content of the second register and performing an exclusive- or operation on the content of the second register and the first register while the reflected light is detected to enter the photo detector near the said photo detectors, and repeating step (1) if the operation result is zero, and storing the content of second register into the first register and enabling the accumulator to count if the operation result is not zero; and
   (3) determining whether or not the count result of the accumulator is equal to 2, and then calculating and displaying the speed if the count result is equal to 2, and repeating step (1) if the count result is not equal to 2.

* * * * *